(12) United States Patent
Jasra et al.

(10) Patent No.: US 7,319,082 B2
(45) Date of Patent: Jan. 15, 2008

(54) PROCESS FOR THE PREPARATION OF MOLECULAR SIEVE ADSORBENT FOR SELECTIVE ADSORPTION OF OXYGEN FROM AIR

(75) Inventors: Raksh Vir Jasra, Gujarat (IN); Chintansinh Dharmendrasinh Chudasama, Gujarat (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/693,643

(22) Filed: Oct. 27, 2003

(65) Prior Publication Data

US 2005/0090380 A1 Apr. 28, 2005

(51) Int. Cl.
*B01J 20/18* (2006.01)
*B01J 29/08* (2006.01)

(52) U.S. Cl. .......................................... 502/73; 502/65

(58) Field of Classification Search .................. 502/60, 502/64, 65, 73, 79
See application file for complete search history.

(56) References Cited

U.S. PATENT DOCUMENTS

| | | | |
|---|---|---|---|
| 3,210,265 A | 10/1965 | Garwood et al. | |
| 3,624,173 A * | 11/1971 | Kirsch et al. | 585/467 |
| 3,979,330 A | 9/1976 | Munzner et al. | |
| 4,093,671 A * | 6/1978 | Murtha et al. | 585/268 |
| 4,094,918 A * | 6/1978 | Murtha et al. | 585/268 |
| 4,125,591 A * | 11/1978 | Lindsley | 502/79 |
| 4,164,465 A * | 8/1979 | Gladrow | 208/120.05 |
| 4,164,483 A * | 8/1979 | Alafandi et al. | 502/73 |
| 4,239,509 A | 12/1980 | Bligh et al. | |
| 4,453,952 A | 6/1984 | Izumi et al. | |
| 4,477,265 A | 10/1984 | Kumar et al. | |
| 4,481,018 A | 11/1984 | Coe et al. | |
| 4,529,412 A | 7/1985 | Hayashi et al. | |
| 4,557,736 A | 12/1985 | Sircar et al. | |
| 4,742,040 A | 5/1988 | Ohsaki et al. | |
| 4,817,392 A | 4/1989 | Agrawal et al. | |
| 4,859,217 A | 8/1989 | Chao | |
| 4,880,765 A | 11/1989 | Knoblauch et al. | |
| 4,943,304 A | 7/1990 | Coe et al. | |
| 4,964,889 A | 10/1990 | Chao | |
| 5,004,482 A | 4/1991 | Haas et al. | |
| 5,081,097 A | 1/1992 | Sharma et al. | |
| 5,091,216 A | 2/1992 | Ekiner et al. | |
| 5,114,440 A | 5/1992 | Reiss | |
| 5,152,813 A | 10/1992 | Coe et al. | |
| 5,174,979 A | 12/1992 | Chao et al. | |
| RE34,595 E | 5/1994 | Chen et al. | |
| 5,429,814 A * | 7/1995 | Young et al. | 424/9.31 |
| 5,454,857 A | 10/1995 | Chao | |
| 5,464,467 A | 11/1995 | Fitch et al. | |
| 5,557,951 A | 9/1996 | Prasad et al. | |
| 5,698,013 A | 12/1997 | Chao | |
| 5,868,818 A | 2/1999 | Ogawa et al. | |
| 5,916,836 A * | 6/1999 | Toufar et al. | 502/86 |
| 5,932,509 A * | 8/1999 | Balse et al. | 502/65 |
| 6,030,916 A | 2/2000 | Choudary et al. | |
| 6,087,289 A | 7/2000 | Choudary et al. | |
| 6,231,644 B1 | 5/2001 | Jain et al. | |
| 2001/0021368 A1* | 9/2001 | Masini et al. | 423/700 |
| 2002/0038602 A1 | 4/2002 | Katz et al. | |

FOREIGN PATENT DOCUMENTS

| | | |
|---|---|---|
| GB | 1058188 A | 2/1967 |
| GB | 1129041 | 10/1968 |
| JP | 49101327 A * | 9/1974 |

OTHER PUBLICATIONS

Database Compendex 'Online! Engineering Information, Inc., New York, NY, US; Jayaraman Ambalavanan et al. "Adsorption of Nitrogen, Oxygen and Argon on Na-CeX Zeolites", XP002317758, Database Acceaaion No. E2003057345189, the whole document & Adsorp; Adsorption Dec. 2002, vol. 8, No. 4, Dec. 2002, pp. 271-278.
International Search Report, No date.
Ohayon et al, "Methods for Pore Size Engineering in ZSM-5 Zeolite", Applied Catalysis A-General, 2001, 217, 241-251.
Niwa et al, "Separation of Oxygen and Nitrogen Due to the Controlled Pore-Opening Size of Chemical Vapor Deposited Zeolite A", Ind. Eng. Chem. Res. 1991, 30, 42-50.
Niwa et al, "Separation of Oxygen and Nitrogen Due to the Controlled Pore-Opening Size of CVD Zeolite A", Chemistry Letters, 1989, 441-442.
Niwa et al, "Fine Control of the Pore-Opening Size of the Zeolite Mordenite by Chemical Vapour Deposition of Silicon Alkoxide", J. Chem. Soc. Faraday Trans.I, 1984, 30, 3135-3145.
Niwa et al, "Control of the Pore-Opening Size of Zeolite ZSM-5 by Chemical Vapor Deposition Silicon Methoxide", The Journal of Physcial Chemistry, vol. 90, No. 23, 1986.

* cited by examiner

*Primary Examiner*—David M Brunsman
(74) *Attorney, Agent, or Firm*—Nixon & Vanderhye PC (57) ABSTRACT

The invention relates to the manufacture of molecular sieve adsorbents, which are selective towards oxygen from its gaseous mixture with argon and/or nitrogen. More particularly, this invention relates to the manufacture of molecular sieve adsorbents useful for the separation of oxygen-argon gaseous mixture. More specifically, the invention relates to the manufacture and use of a molecular sieve adsorbent by cation exchange in zeolites by rare earth cations to obtain oxygen selective adsorbent from its gaseous mixture with nitrogen and argon at ambient conditions of temperature and pressure. Thus prepared adsorbent is useful for the separation and purification of nitrogen and argon from its mixture with oxygen.

8 Claims, 4 Drawing Sheets

PROCESS FOR THE PREPARATION OF MOLECULAR SIEVE ADSORBENT FOR SELECTIVE ADSORPTION OF OXYGEN FROM AIR

FIELD OF THE INVENTION

The present invention relates to a process for the preparation of molecular sieve adsorbent for selective adsorption of oxygen from air. The present invention also relates to the use of rare earth exchanged zeolites as selective adsorbents for separation of gases having closely related physical properties. More particularly, the present invention relates to the preparation and use of adsorbent, which is selective towards oxygen, from a gaseous mixture of oxygen with argon.

BACKGROUND OF THE INVENTION

The use of adsorption techniques to separate a gaseous component from a gaseous stream was initially developed for the removal of carbon dioxide and water from air. Gas adsorption techniques are now employed in processes for the recovery of hydrogen from its mixture with hydrocarbons, and enrichment of oxygen from air.

The four types of adsorbents widely used include activated carbon, zeolite molecular sieves, silica gel and activated alumina. Carbon molecular sieves (CMS), which exhibit very narrow pore size distribution, facilitates separation of air to recover nitrogen has provided a secure and growing market for carbon molecular sieve.

Adsorption processes for the separation of oxygen and argon from air are being increasingly used for commercial purposes for the last three decades. Oxygen requirements in sewage treatment, fermentation, cutting and welding, fish breeding, electric furnaces, pulp bleaching, glass blowing, medical purposes and in the steel industries particularly where the required oxygen purity is between 90 to 95% are being largely met by adsorption based pressure swing or vacuum swing processes. It is estimated that at present, around 20% of the world's oxygen demand is met by adsorptive separation of air. However, the maximum attainable purity by adsorption processes is around 95% with separation of 0.934 mole percent argon present in the air being a limiting factor to achieve 100% oxygen purity. Furthermore, adsorption based production of oxygen from air is economically not competitive to cryogenic fractionation of air for production levels of more than 200 tons per day.

Argon gas is mainly used in industries as an inert gas for creating inert atmosphere. An argon or argon-hydrogen mixture is employed in the production of high-purity iron. Argon is also used in welding, cutting, and spraying of metals, depending on the welding process, the noble gas is used pure, as a mixture, or in combination with oxygen, hydrogen, or carbon dioxide. Argon/argon-hydrogen mixtures (>5% $H_2$) are used as protective gases for plasma welding. There are many potential applications of argon and it is expected that this work will lead to increased consumption of argon in the future.

For the adsorbents used in adsorption separation processes, there are two key; characteristics namely adsorption capacity and adsorption selectivity which need to be considered to assess their potential. Adsorption capacity of the adsorbent is defined as the amount in terms of volume or weight of the adsorbent. The higher the adsorbent's capacity for the desired components the better is the adsorbent as the increased adsorption required to separate a specific amount of a component from a mixture of particular concentration. Such a reduction in adsorbent quantity in a specific adsorption process brings down the cost of a separation process.

The adsorption selectivity of a component over the other is calculated as the ratio of the volumes of gas adsorbed at any given pressure and temperature. The adsorption selectivity of a component results from steric effect, i.e., when the adsorption isotherms of components of a gas mixture differ appreciably; kinetic effect, when the components have substantially different adsorption rates.

Adsorption for oxygen and nitrogen production is being widely used and tremendous research effort is being directed to improve the adsorption processes for higher adsorption capacity and selectivity. Adsorbents affect separations by adsorbing one or more components of the mixture strongly than the others components present in the mixture. The various interactive forces involved in adsorption process are van der Waals interactions, acid-base interactions, hydrogen bond, electrostatic, chelation, and clathration. Therefore, adsorbents are appropriately modified to enhance the interactions between adsorbent and adsorbate molecules to improve adsorption capacity and selectivity. Zeolites which are crystalline inorganic porous materials having pores with molecular dimensions have largely been used for adsorption separation. As the extra framework cations of the zeolites are reasonably mobile, cations exchange in zeolites is one the most common used techniques for surface modifications with cations of suitable size and charge to enhance zeolite adsorbate interactions. Literature on adsorbent development work carried out on zeolites shows that most of the reported work is confined to alkali and alkaline earth cations as extra framework cations. Adsorption of nitrogen, oxygen and argon in zeolites with cations having higher than bivalent is sparsely reported. As trivalent cations have higher charge density, they will have higher electrostatic interactions with nitrogen molecules if these cations are present at sites accessible to nitrogen molecules.

The principal characteristic of the separation, removal or concentration of oxygen, nitrogen and argon from the air is that usually there is no cost for the starting material, which is air. The cost of the desired gas produced or removed, depends essentially upon the following other factors.

(a) Costs of equipment necessary for separating, or concentrating the gas,
(b) Costs of energy necessary for operating the equipment,
(c) When gas with high purity is needed, the cost of the additional purification step which has to be taken into account.

Taking the above factors into consideration, various economically advantageous processes have, heretofore, been proposed. These include, for example; a process wherein air is liquefied al low temperatures to separate oxygen or nitrogen making use of difference in the boiling point between liquid oxygen (−182.9° C.) and liquid nitrogen (−195.8° C.). The apparatus employed is suited for producing large amounts of oxygen and nitrogen in the world is based on this procedure. Disadvantages of the process is that it requires large amounts of power, large-scale equipment is necessary site specific and portability is very less, it takes hours for switching on and switching off the plant. Last two decades, adsorption and membrane based processes for the separation of oxygen, nitrogen from air has emerged as potential alternatives.

A membrane system has been employed for the separation of oxygen and nitrogen from air. U.S. Pat. No. 5,091,216 (1992) to Hayes et al; U.S. Pat. No. 5,004,482 (1991) to Haas et al. and U.S. patent application 2,038,62 (2002), to Katz et al disclose the separation of oxygen and nitrogen from air using polymeric type membranes. The membrane based systems works at very high pressure. The main drawbacks of this method is the thin polymeric films are too weak to withstand the high differential gas pressures required for the separation and purity of the product gas is only around 50%.

In the prior art, adsorbent which are selective for nitrogen from its mixture with oxygen and argon have been reported [U.S. Pat. No. 5,114,440 (1992) to Reiss], [U.S. Pat. No. 4,481,018 (1984) to Coe et al., U.S. Pat. No. 4,557,736 (1985) to Sircar et al., U.S. Pat. No. 4,859,217 (1989) to Chao; Chien-Chung, U.S. Pat. No. 5,152,813 (1992) to Coe et al., U.S. Pat. No. 5,174,979 (1992) to Chao; Chien-Chung et al., U.S. Pat. No. 5,454,857 (1995) to Chao; Chien-Chung., U.S. Pat. No. 5,464,467 (1995) to Fitch et al., U.S. Pat. No. 5,698,013 (1997) to Chao; Chien-Chung., U.S. Pat. No. 5,868,818 (1999) to Ogawa et al., U.S. Pat. No. 6,030,916 (2000) to Choudary et al.,], [U.S. Pat. No. 4,964,889 (1990) to Chao; Chien-Chung, Gerhard,], [U.S. Pat. No. 4,943,304 (1990) to Coe et al.,] and [U.S. Pat. No. 6,231,644 (2001) to Jain et al.] wherein the zeolites of type A, faujasite, clinoptilolite, chabazite and monolith respectively have been used. The efforts to enhance the adsorption capacity and selectivity have been reported by exchanging the extra framework cations with alkali and/or alkaline earth metal cations and increasing the number of extra framework cations of the zeolite. The adsorption selectivity for nitrogen has also been substantially enhanced by exchanging the zeolite with cations like lithium and/or calcium in faujasite type zeolite. These adsorbents have been employed in processes for the separation or concentration of oxygen by removing nitrogen selectively from the air. The drawback of these adsorbents are the maximum attainable oxygen purity by adsorption processes is around 95%, with separation of 0.934-mole percent argon present in the air being a limiting factor t achieve 100% oxygen purity. These adsorbents are also highly moisture sensitive and the adsorption capacity and selectivity will decay in the presence of moisture.

U.S. Pat. No. 4,453,952 (1984) to Izumi et al. discloses the manufacture of an oxygen selective adsorbent by substituting the Na cations of zeolite A with K and Fe(II). The adsorbent shows oxygen selectivity only at low temperature and its preparation requires iron exchange carried out at around 80° C. using aqueous salt solutions of metal ions followed by exchange with potassium. The drawback of this invention is that the potassium exchange in zeolite leads to lower thermal and hydrothermal stability of the adsorbent.

U.S. Pat. No. 3,979,330 to Munzner et al. discloses the preparation of carbon containing molecular sieves in which coke containing up to 5% volatile components is treated at 600-900° C. in order to split off carbon from a hydrocarbon. The split-off carbon is deposited in the carbon framework of the coke to narrow the existing pores. The drawback of this process is deposition on carbon framework is not uniform and very energy intensive process.

U.S. Pat. No. 4,742,040 to Ohsaki et al. discloses a process for making a carbon molecular sieve having increased adsorption capacity and selectivity by palletising powder of charcoal containing small amounts of coal tar as a binder, carbonising, washing in mineral acid solution to remove soluble ingredients, adding specified amounts of creosote or other aromatic compounds, heating at 950-1000° C., and then cooling in an inert gas. The drawback of this process is energy intensive and tedious and organic compounds are expensive.

U.S. Pat. No. 4,880,765 to Knoblauch et al., discloses a process for producing carbon molecular sieves with uniform quality and good separating properties by treating a carbonaceous product with inert gas and steam in a vibrating oven with multi step and further treating it with benzene at high temperatures thereby narrow existing pores. Preparation of carbon molecular sieve is a multi-step process with utmost care at each state to get totally reproducible carbon molecular sieve. Additionally, the process is very high temperature process, which results into higher cost of the products.

U.S. Pat. No. 5,081,097 (1992) to Sharma et al., discloses copper modified carbon molecular sieves for selective removal of oxygen from air. The sieve is prepared by pyrolysis of a mixture of a copper-containing material and polyfunctional alcohol to form a sorbent precursor. The sorbent precursor is then heated and reduced to produce a copper modified carbon molecular sieve. Pyrolysis is high temperature process making the whole process of preparation of the adsorbent an energy intensive process.

U.S. Pat. No. 6,087,289 (2000) to Choudary et al. discloses a process for the preparation of a zeolite-based adsorbent containing cerium cations for the selective adsorption of oxygen from the gas mixture. Cerium exchange into zeolite is carried out under reflux conditions using aqueous solution of cerium salt at around 80° C. for 4-8 hours and repeating the ion exchange process several times and separation of gases was studied by gas chromatography in very low-pressure range. The main drawbacks of this adsorbent are oxygen selectivity being obtained only in the low-pressure region. Additionally, adsorption was studied only by gas chromatography in limited pressure range. Thus higher pressure range adsorption data was not obtained.

In another approach, chemical vapour deposition technique was used for controlling the pore opening size of the zeolites by the deposition of silicon alkoxide [M. Niwa et al., JCS Farady Trans. I, 1984, 80, 3135-3145; M. Niwa et al., M. Niwa et al., J. Phys. Chem., 1986, 90, 6233-6237; Chemistry Letters, 1989, 441-442; M. Niwa et al., Ind. Eng. Chem. Res., 1991, 30, 38-42; D. Ohayon et al., Applied Catalysis A-General, 2001, 217, 241-251]. Chemcal vapour deposition is carried out by taking a requisite quantity of zeolite in a glass reactor, which is thermally activated at 450° C. in situ under inert gas like nitrogen flow. The vapours of silicon alkoxide are continuously injected into inert gas stream, which carries the vapours to zeolite surface where alkoxide chemically reacts with silanol groups of the zeolite. Once the desired quantity of alkoxide is deposited on the zeolite, sample is heated to 550° C. in air for 4-6 hours after which it is brought down to ambient temperature and used for adsorption. The major disadvantages of this technique are (i) Chemical vapour deposition, which leads to non-uniform coating of alkoxide results in non-uniform pore mouth closure, (ii) The process has to be carried out at elevated temperature where the alkoxide is likely to be vaporised.

U.S. Pat. No. 4,239,509 (1980) to Bligh et al. discloses a method for purifying crude argon containing argon, oxygen and nitrogen which comprises the steps of reducing the amount of nitrogen in the crude argon to between a trace and 0.15% (by volume) and passing the remaining oxygen and argon, together with residual nitrogen, through 4A molecular sieve to separate the oxygen and argon. All the remaining oxygen and nitrogen has to pass through a volume of 4A molecular sieve, which is wholly at or below −250 F. The disadvantages of this process are adsorption process was carried out at −157° C. (−250° F.) temperature, and the arrangement of equipment is complicated for very low temperature separation, which is not economically acceptable.

U.S. Pat. No. 4,447,265 (1984) to Kumar et al. discloses that argon is recovered from a gas stream comprising the same in admixture with oxygen and nitrogen, by a vacuum swing adsorption (VSA) process wherein the mixed gas is passed through an adsorbent bed having thermodynamic selectivity for adsorption of nitrogen and unabsorbed portion is then passed through a second adsorbent bed having kinetic selectivity for retaining oxygen. Both adsorbent beds are regenerated by vacuum desorption, applied to the first bed for a longer time period than that of the second bed. The mixed gas stream fed to the VSA unit may be that obtained from the crude argon column associated with a cryogenic air separation plant and waste gas from the VSA unit may be recycled to the main column of the cryogenic air separation plant, thus enhancing argon recovery. The disadvantages of this possess are regeneration of the adsorbent is time consuming process and also for more recovery; of argon required cryogenic unit otherwise recovery is low.

U.S. Pat. No. 4,529,412 (1985) to Hayashi et al. discloses a process for obtaining high purity argon from air by means of pressure-swing-adsorption. The air is initially passed through a zeolite molecular sieve-packed adsorption apparatus and then again passed through carbon molecular sieve-packed adsorption apparatus, and then subjected to pressure-swing-adsorption operation, obtaining concentrated argon and high purity oxygen simultaneously. The drawback of this process is, to adsorption beds are required and process takes longer time. Moreover, in the process two beds are required for production thereby increasing the production cost.

U.S. Pat. No. 4,817,392 (1989) to Agrawal et al. discloses a process for the production and recovery of an $O_2$-lean argon stream from a gas mixture containing argon and oxygen. The argon-containing gas mixture is initially treated in a cryogenic separation unit to produce a crude argon stream having an argon concentration between 80-98%. The crude argon stream is then passed to a membrane based separation unit where it is separated to produce an $O_2$-lean argon stream and an $O_2$-rich stream. The $O_2$-rich stream is recycled to the cryogenic separation unit and the Ar-lean oxygen stream is recovered as product or further purified. The disadvantage of this process is that it requires membrane based separation, thereby increasing the production cost.

U.S. Pat. No. 5,557,951 (1996) to Prasad et al. discloses an apparatus for producing high purity product grade argon from an argon-containing stream using a cryogenic argon column in combination with a solid electrolyte ionic or mixed conductor membrane. The disadvantage of this process is recovery of argon can be achieved by two processes—one is cryogenic and the other is membrane separation, thereby increasing the production cost.

US Patent RE 34, 595 (1994) to Chen et al. discloses a process for purifying argon gas, specially an argon gas stream obtained by cryogenically separating air, wherein the argon gas is heated and compressed, and then permeated through a solid electrolyte membrane selective to the permeation of oxygen over other components of the gas, and removing oxygen from the argon by selective permeation of oxygen through the membrane. The purified argon can then be distilled to remove other components such as nitrogen. A process is provided for producing a purified argon stream wherein oxygen and nitrogen are removed from crude bulk argon streams, particularly those produced by cryogenic, adsorptive or membrane separation of air. The process comprises separating a heated, compressed crude argon stream containing nitrogen and oxygen into an oxygen permeate stream and an oxygen-depleted argon stream by passing the compressed heated argon stream through a solid electrolyte membrane selective to the permeation of oxygen. The oxygen-depleted argon stream is then fed to a distillation column to separate nitrogen from the oxygen-depleted argon stream to form the purified argon stream and a nitrogen waste system.

OBJECTS OF THE INVENTION

The main object of the present invention is to provide a process for the preparation of molecular sieve adsorbent for selective adsorption of oxygen from air, which obviates, the drawbacks as detailed above.

Still another object of the present invention is to provide an oxygen selective zeolite based adsorbent.

Still another object of the present invention is to provide an adsorbent, which can be prepared by the exchanging rare earth cations especially cerium, europium and gadolinium in ziolite X.

Yet another object of the present invention is to provide oxygen selective adsorbent by a simple post-systhesis modification of zeolite X.

Yet another object of the present invention is to provide an adsorbent, which can be regenerated by desorption of oxygen by controlling equilibrium adsorption pressure.

Yet another object of the present invention is to provide an adsorbent, which is selective towards oxygen over argon with high selectivity and can be commercially for the separation and purification of argon.

SUMMARY OF THE INVENTION

The present invention provides a process for the preparation of molecular sieve adsorbent for selective adsorption of oxygen from air, by exchanging powder and pellet form of sodium zeolite X, with an aqueous solution of rare earth cations such as cerium, europium and gadolinium, at elevated temperature. The dry zeolite X, containing 20 to 95% rare earth cations of the total exchangeable sodium cations, after activation at high temperature and vacuum were subjected to adsorption studies for oxygen, nitrogen and argon using a static volumetric system of an adsorption equipment supplied by Micromeritics Corporation USA (Model ASAP 2010). Adsorption capacities and selectivity for rare earth exchanged zeolite for oxygen, nitrogen and argon was measured at 15° C. and in the pressure range of 0.5 to 760 mmHg. From these data adsorption isotherm were plotted and pure component selectivity of gases were calculated. This invention provides a process to prepare zeolite adsorbent having selectivity for oxygen over nitrogen and argon.

Accordingly, the present invention provides a process for preparing a molecular sieve adsorbent for selective adsorption of oxygen from air, the process comprising (i) exchanging zeolite X in powder or pellet form with water-soluble salt of a rare earth metal selected from the group consisting of cerium, europium, gadolinium and any mixture thereof, (ii) filtering the mixture, washing the powder or pellet with hot distilled water till it is free from anions to obtain an exchanged zeolite;

(iii) drying the exchanged zeolite;

(iv) and activating the exchanged zeolite.

In an embodiment of the present invention, zeolite X in powder form having 100% crystallinity and spherical pellet forms can be used for the preparation of the surface modified molecular sieve adsorbent.

In another embodiment of the present invention, Na cations of zeolite were exchanged with salts or rare earth ions 10 to 100 equivalent percentage (Cerium Europium and Gadolinium) are loaded using any water-soluble salts of chloride nitrate and acetate.

In still another embodiment of the present invention, the cation exchange can be carried at a temperature in the range of 30° C. to 90° C. for a period in the range of 4 to 8 hours.

In still another embodiment of the present invention, the cation exchange can be carried out at a cation concentration in the range of 0.01 to 0.1 M solution.

In still another embodiment of the present invention, the exchanged zeolite may be dried in a temperature range of 20° C. to 80° C. in air or under vacuum conditions.

In still another embodiment of the present invention, the exchanged zeolite may be activated in the temperature range of 350 to 450° C. for a period in the range of 3-6 hours followed by cooling under inert or vacuum condition.

BRIEF DESCRIPTION OF THE ACCOMPANYING DRAWINGS

In the drawings accompanying this specification.

DETAILED DESCRIPTION OF THE INVENTION

Figure 1:
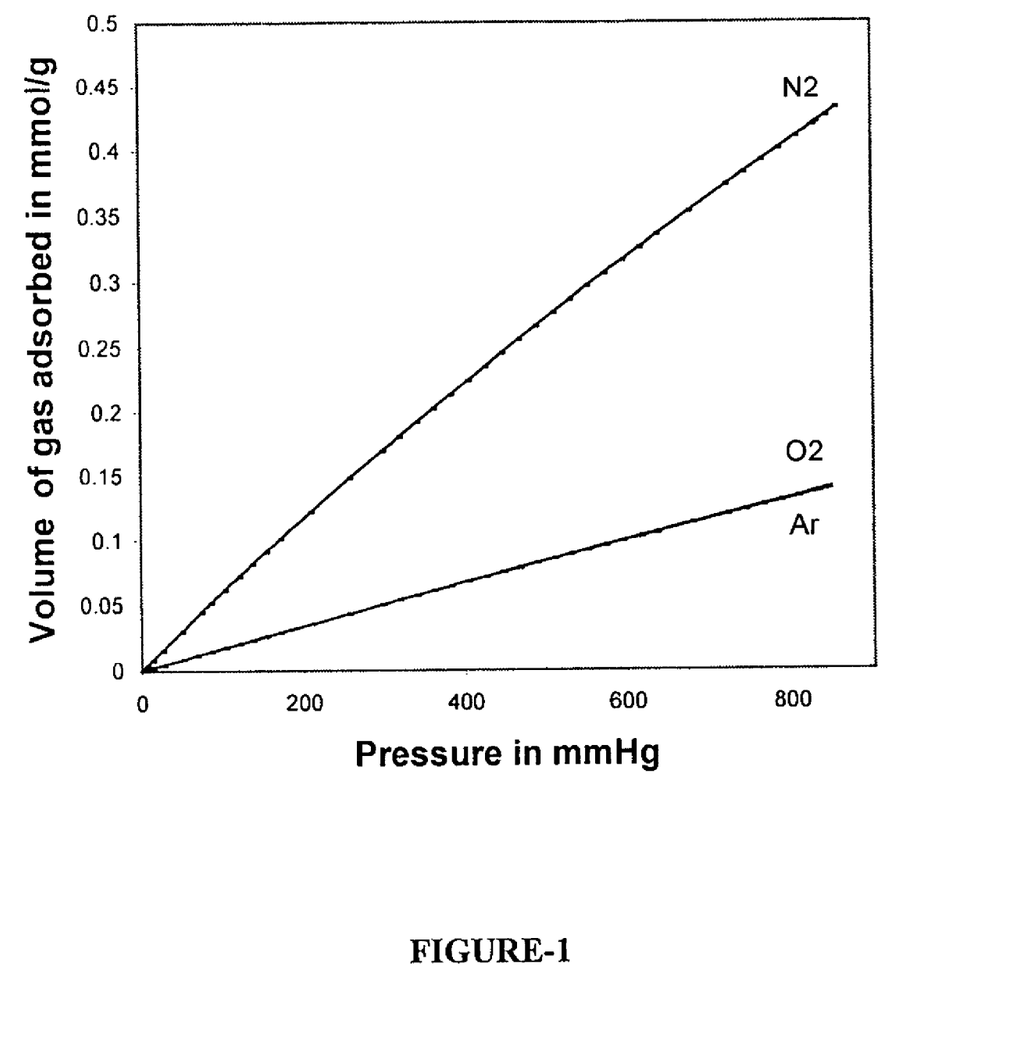
FIG. 1 represents the adsorption isotherms of nitrogen, argon and oxygen at 15° C. on the zeolite X pellets at pressures up to 850 mm Hg.
Figure 2:
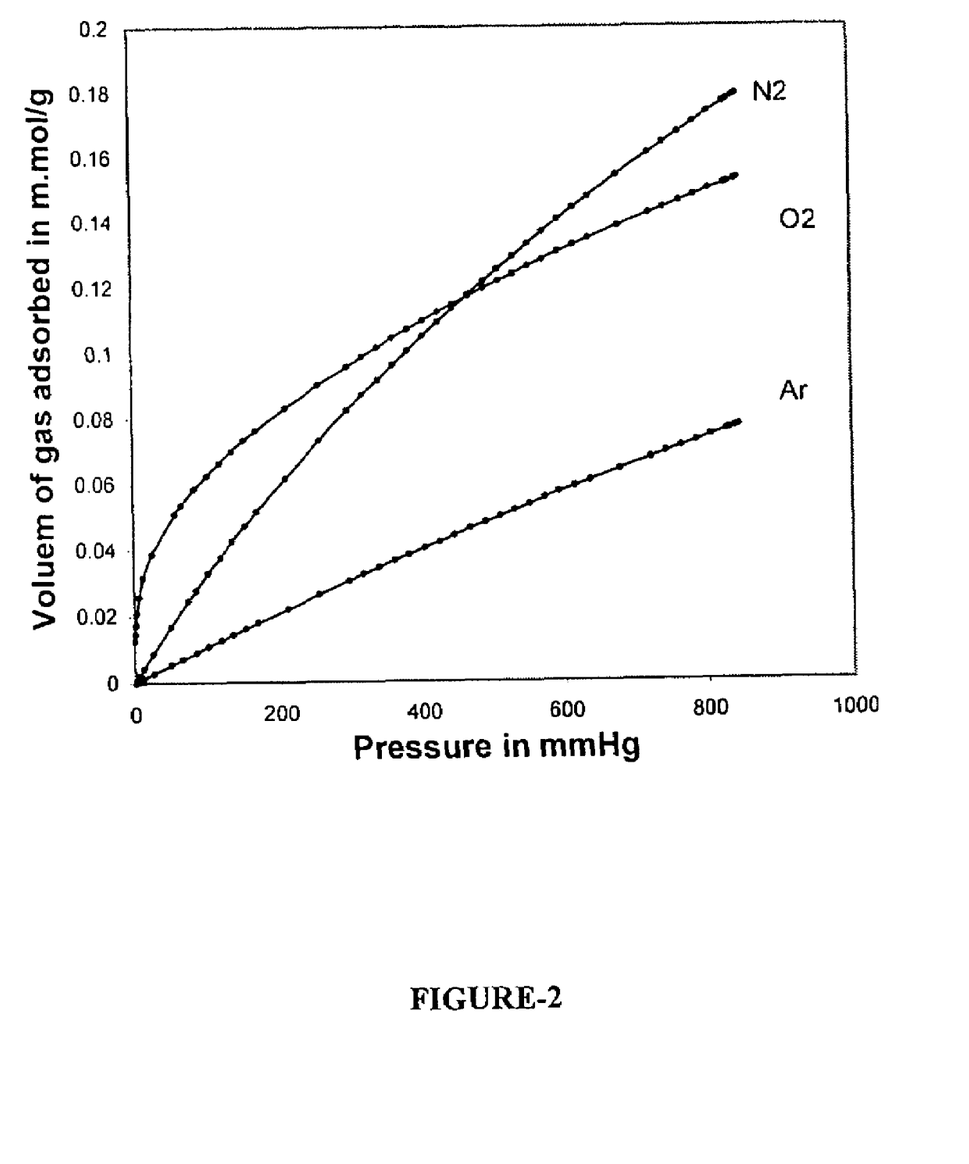
FIG. 2 represents the adsorption isotherms of nitrogen, argon and oxygen at 15° C. on the cerium exchanged zeolite X pellets at pressures up to 850 mm Hg.
Figure 3:
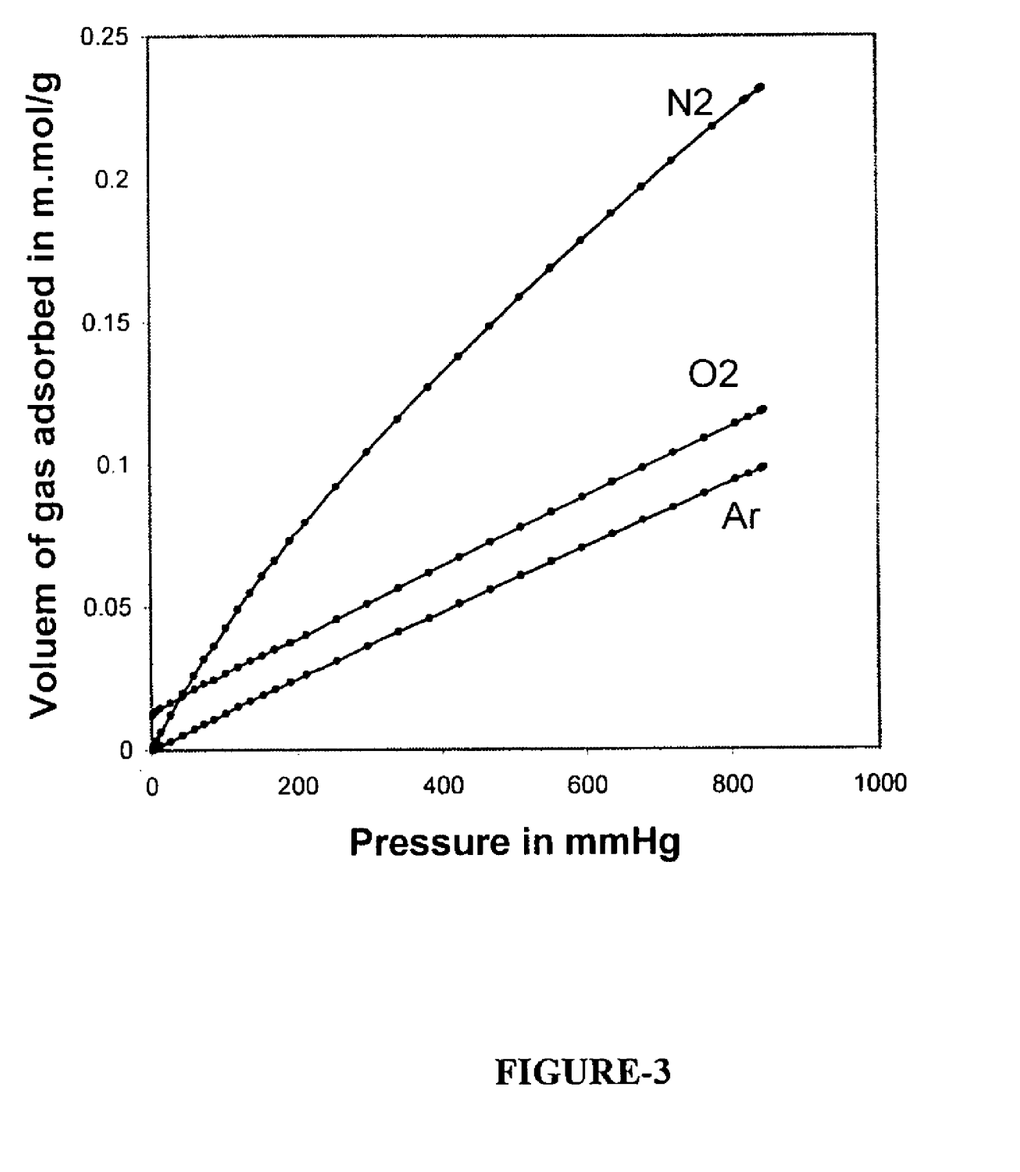
FIG. 3 represents the adsorption isotherms of nitrogen, argon and oxygen at 15° C. on the europium exchanged zeolite Z pellets at pressures up to 850 mm Hg.
Figure 4:
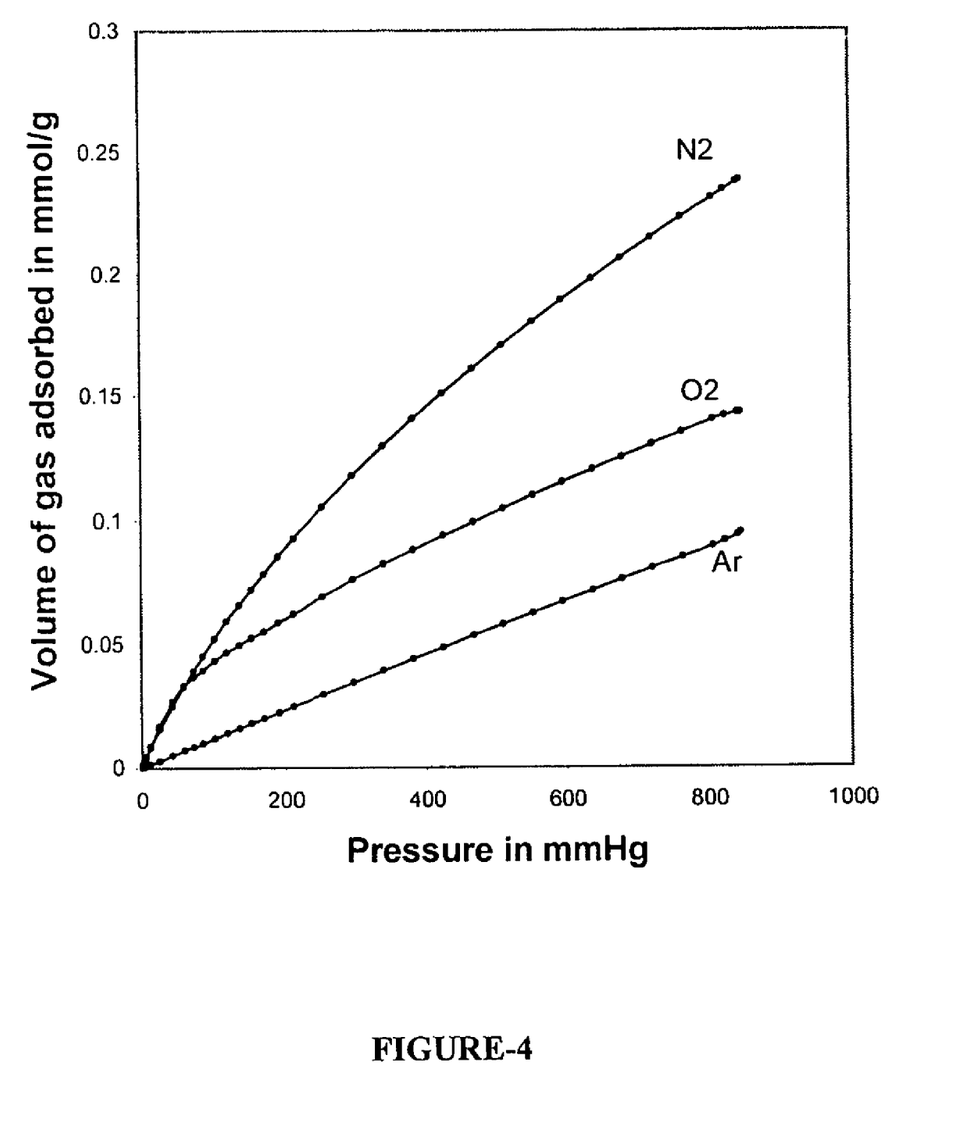
FIG. 4 represents the adsorption isotherms of nitrogen, argon and oxygen at 15° C. on the gadolunium exchanged zeolite X pellets at pressures up to 850 mm Hg.

The present invention provides a process for the preparation of an oxygen selective adsorbent, which has oxygen adsorption selectivity over nitrogen and argon. Furthermore, this adsorbent displays higher interaction with oxygen compared to nitrogen and argon as observed from heats adsorption values determined I the in Henry region.

Zeolites, which are microporous crystalline aluminosilicates, are finding increased applications as adsorbents for separating mixtures of compounds having closely related molecular properties.

The attributes which makes the zeolites attractive for separation include, an unusually high thermal and hydrothermal stability, uniform pore structure, easy pore aperture modification and substantial adsorption capacity even at low adsorbate pressures. Furthermore, zeolites can be produced synthetically under relatively moderate hydrothermal conditions.

The zeolite NaX powder and pellet [$Na_{86}(AlO_2)_{86}(SiO_2)_{106}wH_2O$] was used as the starting material. X-ray diffraction data showed that the starting material was highly crystalline. A known amount of the zeolite NaX powder and pellet [$Na_{86}(AlO_2)_{86}(SiO_2)_{106}wH_2O$] was refluxed with 0.01 M rare earth (Ce, Eu and Gd) acetate and chloride solution taken in 2 litre round bottomed flask with zeolite X (powder or pellet) to rare earth solution ratio 1:80 at 80-120° C. for 4 h. Zeolite samples having different amount of rare earth were prepared by subjecting repeated rare earth cation exchange into the zeolite. Zeolite sample were filtered after reflux and washed with distilled water until free from chloride as tested by $AgNO_3$ solution. In case of acetate, excess wash with not (60° C.) water was done. Extent of rare earth exchange into zeolite X was determined from the concentration of rare earth cations in original solution and the filtrate. Rare earth cations were analysed by using 0.01 M EDTA solution with xylenol orange tetra sodium salt indicator at pH=6 employing sodium acetate buffer.

Oxygen, nitrogen and argon adsorption at 15° C. was measured using a static volumentric system (Micromeritics, USA. ASAP 2010), after activating the sample at 350° C. to 450° C. under vacuum for 4-8 hours as described in the examples. Addition of the adsorbate gas was made at volumes required to achieve a targeted set of pressures ranging from 100 to 760 mmHg. A minimum equilibrium interval of 5 seconds was used to determine equilibrium for each measurement point.

The pure component selectivity of one gas over other (A and B) was determined by the equation, $$\alpha_{A/B} = [V_A/V_B]_{P,T}$$

where $V_A$ and $V_B$ are the volumes of gas A and B adsorbed at equilibrium pressure P and temperature T.

Structural analysis of the zeolite samples was done by X-ray diffraction wherein the crystallinity of the zeolites are measured from the intensity of the well-defined peaks at 2 theta values of 6, 10, 11, 8, 15.5, 20, 23.4, 26.8, 30.5, 31, 32 and 33.8 X-ray powder diffraction was measured using PHILIPS X'pert MPD system equipped with XRK 900 reaction chamber.

The important inventive steps involved in the present invention are that the molecular sieve adsorbent, formation of oxygen selective species inside the zeolite cavities (i) by exchanging with lanthanide aqueous solution and in addition to cation exchange by forming non-stoichiometric oxide of cerium/europium/gadolinium which can selectively; interact with oxygen molecules (ii) the process lies in providing a new technique, in addition to conventional cation exchange, of introducing sorbate specific metal oxide in the micropores of the zeolites for developing new adsorbents. The non-stochiometric oxides of these rare earths like cerium and europium can react with oxygen in a reversible manner and reversibly changes the oxidation state thus acting as chemisorption-assisted adsorption. High heats of adsorption values observed also are indicative chemisorption type interactions with oxygen molecule.

The adsorbtive capacity of the catalyst was verified evaluated by adsorbing nitrogen, oxygen and argon gases on exchanged zeolites having 99.9% purity at 15° C. and in the pressure range of 0.5 to 800 mmHg and then calculating the adsorption selectivity of gases at 15° C. and 100 and 760-mmHg pressures.

The following examples are given by way of illustration and therefore should not be construed to limit the scope of the present invention.

EXAMPLE-1

1.0 gm of zeolite NaX pellet, [$Na_2O)_{86}(Al_2O_3)_{86}\cdot(SiO_2)_{106}\cdot wH_2O$], was activated at 350° C. temperature under vacuum at $10^{-3}$ mmHg and adsorption measurements were carried out for $N_2$, $O_2$, Ar having 99.9% purity at 15° C. using volumetric system (Micromeritics ASAP 2010C)

operating at 760 mmHg pressure with equilibrium interval of 5 seconds. Adsorption capacity for $N_2$, $O_2$ and Ar is 9.74 cc/g, 3.31 cc/g and 3.29 cc/g respectively at 15° C. temperature and 760-mmHg pressures. Selectivity for nitrogen over oxygen is 2.9; selectivity for nitrogen over argon is 2.96, and selectivity for oxygen over argon is 1.0 at 15° C. at 760-mmHg pressures.

EXAMPLE-2

25.0 g of the molecular sieve NaX pellet was exchanged with 0.301M Cerium acetate solutions in the ratio 1:80 and refluxed at 80° C. for 4 hours. The hot solution was filtered, washed with hot distilled water, until the washings are free from acetate ions and then dried in air at room temperature (28° C.). The Cerium content in dry zeolite amount is 25% of the total replaceable sodium cations. This ziolite was activated at 350° C. temperature under vacuum ($10^{-3}$ mmHg) and the weight of sample after activation was 0.17 gm. The adsorption measurement was carried out at 15° C. temperature and 760-mmHg pressures. The adsorption capacity for oxygen is 2.4 cc/g at 15° C. temperature and 760 mmHg and selectivity for oxygen over argon is 1.0, selectivity for nitrogen over oxygen is 3.3 and nitrogen over argon is 3.3 at the 100-mmHg pressure.

EXAMPLE-3

25.0 g of the molecular sieve NaX pellet was exchanged with 0.01M Cerium acetate solutions in the ratio 1:80 and refluxed at 80° C. for 4 hours. The hot solution was filtered, washed with hot distilled water, until the washings are free from acetate ions and then dried in air at room temperature (28° C.). The cerium content in dry zeolite amount is 84% of the total replaceable sodium cations. This zeolite was activated at 350° C. temperature under vacuum ($10^{-3}$ mmHg) and the weight of sample after activation was 1.4 gm. The adsorption measurement was carried out at 15° C. temperature and 760-mmHg pressures. The adsorption capacity for oxygen is 3.7 cc/g at 15° C. temperature and 760 mmHg and selectivity for oxygen over argon is 8.0, selectivity for nitrogen over oxygen is 0.4 and nitrogen over argon is 3.5 at the 100-mmHg pressure.

EXAMPLE-4

25.0 g of the molecular sieve NaX pellet was exchanged with 0.01M Cerium chloride solutions in the ratio 1:80 and refluxed at 80° C. for 4 hours. The hot solution was filtered, washed with hot distilled water, until the washings are free from chloride ions and then dried in air at room temperature (28° C.). The cerium content in dry zeolite amount is 28% of the total replaceable sodium cations. This zeolite was activated at 3500C temperature under vacuum ($10^{-3}$ mmHg) and the weight of sample after activation was 0.58 gm. The adsorption measurement was carried out at 15° C. temperature 760-mmHg pressures. The adsorption measurement was carried out at 15° C. temperature and 760 mmHg and selectivity for oxygen over argon is 3.0, selectivity for nitrogen over oxygen is 1.3 and nitrogen over argon is 4.0 at the 100-mmHg pressure.

EXAMPLE-5

25.0 g of the molecular sieve NaX pellet was exchanged with 0.01M Cerium chloride solutions in the ratio 1:80 and refluxed at 80° C. for 4 hours. The hot solution was filtered, washed with hot distilled water, until the washings are free from chloride ions and then dried in air at room temperature (28° C.). The cerium content in dry zeolite amount is 93% of the total replaceable sodium cations. This zeolite was activated at 350° C. temperature under vacuum ($10^{-3}$ mmHg) and the weight of sample after activation was 0.53 gm. The adsorption measurement was carried out at 15° C. temperature and 760-mmHg pressures. The adsorption capacity for oxygen is 3.1 cc/g at 15° C. temperature and 760 mmHg and selectivity for oxygen over argon is 3.5, selectivity for nitrogen over oxygen is 1.4 and nitrogen over argon is 5.0 at the 100-mmHg pressure.

EXAMPLE-6

25.0 g of the molecular sieve NaX powder was exchanged with 0.014M Cerium acetate solutions in the ratio 1:80 and refluxed at 80° C. for 4 hours. The hot solution was filtered, washed with hot distilled water, until the washings are free from acetate ions and then dried in air at room temperature (28° C.). The cerium content in dry zeolite amount is 74% of the total replaceable sodium cations. This zeolite was activated at 350° C. temperature under vacuum ($10^{-3}$ mmHg) and the weight of sample after activation was 0.13 gm. The adsorption capacity for oxygen is 4.6 cc/g at 15° C. temperature and 760 mmHg and selectivity for oxygen over argon is 4.0, selectivity for nitrogen over oxygen is 1.1 and nitrogen over argon is 4.2 at the 100-mmHg pressure.

EXAMPLE-7

25.0 g of the molecular sieve NaX pellet was exchanged with 0.01M Cerium acetate solutions in the ratio 1:80 and refluxed at 50° C. for 4 hours. The hot solution was filtered, washed with hot distilled water, until the washings are free from acetate ions and then dried in air at room temperature (28° C.). The cerium content in dry zeolite amount is 20% of the total replaceable sodium cations. This zeolite was activated at 350° C. temperature under vacuum ($10^{-3}$ mmHg) and the weight of sample after activation was 0.22 gm. The adsorption measurement was carried out at 15° C. temperature and 760-mmHg pressures. The adsorption capacity for oxygen is 2.2 cc/g at 15° C. temperature and 760 mmHg and selectivity for oxygen over argon is 1.5, selectivity for nitrogen over oxygen is 2.2 and nitrogen over argon is 3.2 at the 100-mmHg pressure.

EXAMPLE-8

25.0 g of the molecular sieve NaX pellet was exchanged with 0.1M Cerium acetate solutions in the ratio 1:80 and refluxed at 80° C. for 4 hours. The hot solution was filtered washed with hot distilled water, until the washings are free from acetate ions and then dried in air at room temperature (28° C.). The cerium content in dry zeolite amount is 30% of the total replaceable sodium cations. This zeolite was activated at 350° C. temperature under vacuum ($10^{-3}$ mmHg) and the weight of sample after activation was 0.15 gm. The adsorption measurement was carried out at 15° C. temperature and 760-mmHg pressures. The adsorption capacity for oxygen is 3.2 cc/g at 15° C. temperature and 760 mmHg and selectivity for oxygen over argon is 2.0, selectivity for nitrogen over oxygen is 2.4 and nitrogen over argon is 3.8 at the 100-mmHg pressure.

EXAMPLE-9

25.0 g of the molecular sieve NaX pellet was exchanged with 0.01M Europium acetate solutions in the ratio 1:80 and refluxed at 80° C. for 4 hours. The hot solution was filtered, washed with hot distilled water, until the washings are free from acetate ions and then dried in air at room temperature (28° C.). The europium content in dry zeolite amount is 52% of the total replaceable sodium cations. This zeolite was activated at 3500C temperature under vacuum ($10^{-3}$ mmHg) and the weight of sample after activation was 0.59 gm. The adsorption measurement was carried out at 15° C. temperature and 760-mmHg pressures. The adsorption capacity for oxygen is 2.3 cc/g at 15° C. temperature and 760 mmHg and selectivity for oxygen over argon is 1.7, selectivity for nitrogen over oxygen is 1.1 and nitrogen over argon is 2.7 at the 100-mmHg pressure.

EXAMPLE-10

25.0 g of the molecular sieve NaX pellet was exchanged with 0.01M Europium acetate solutions in the ratio 1:80 and refluxed at 80° C. for 4 hours. The hot solution was filtered, washed with hot distilled water, until the washings are free from acetate ions and then dried in air at room temperature (28° C.). The europium content in dry zeolite amount is 67% of the total replaceable sodium cations. This zeolite was activated at 350° C. temperature under vacuum ($10^{-3}$ mmHg) and the weight of sample after activation was 0.52 gm. The adsorption measurement was carried out at 15° C. temperature and 760-mmHg pressures. The adsorption capacity for oxygen is 2.6 cc/g at 15° C. temperature and 760 mmHg and selectivity for oxygen over argon is 2.3, selectivity for nitrogen over oxygen is 1.3 and nitrogen over argon is 3.1 at the 100-mmHg pressure.

EXAMPLE-11

25.0 g of the molecular sieve NaX pellet was exchanged with 0.01M Gadolinium acetate solutions in the ratio 1:80 and refluxed at 80° C. for 4 hours. The hot solution was filtered, washed with hot distilled water, until the washings are free from acetate ions and then dried in air at room temperature (28° C.). The gadolinium content in dry zeolite amount is 82% of the total replaceable sodium cations. This zeolite was activated at 35° C. temperature under vacuum ($10^{-3}$ mmHg) and the weight of sample after activation was 0.59 gm. The adsorption measurement was carried out at 15° C. temperature and 760-mmHg pressures. The adsorption capacity for oxygen is 3.2 cc/g at 15° C. temperature and 760 mmHg and selectivity for oxygen over argon is 4.0, selectivity for nitrogen over oxygen is 1.3 and nitrogen over argon is 5.0 at the 100-mmHg pressure.

EXAMPLE-12

25.0 g of the molecular sieve NaX pellet was exchanged with 0.01M Gadolinium acetate solutions in the ratio 1:80 and refluxed at 80° C. for 4 hours. The hot solution was filtered, washed with hot distilled water, until the washings are free from acetate ions and then dried in air at room temperature (28° C.). The gadolinium content in dry zeolite amount is 88% of the total replaceable sodium cations. This zeolite was activated at 350° C. temperature under vacuum ($10^{-3}$ mmHg) and weight of sample after activation was 0.66 gm. The adsorption measurement was carried out at 15° C. temperature and 760-mmHg pressures. The adsorption capacity for oxygen is 2.8 cc/g at 15° C. temperature and 760 mmHg and selectivity for oxygen over argon is 2.0, selectivity for nitrogen over oxygen is 3.0 and nitrogen over argon is 6.0 at the 100-mmHg pressure.

The main advantages of the invention are:
1. The adsorbent, prepared by the modification of zeolite X shows oxygen selectivity over nitrogen argon.
2. A simple exchange with aqueous solution of rare earth cations is used for the preparation of the adsorbent.
3. The exchange is carried out at 80° C. and atmospheric pressure.
4. The adsorbent is very easy to handle.
5. The adsorbent shows oxygen/argon selectivity of nearly 8 in the low-pressure range studied.
6. The adsorbent is useful in the commercial separation and purification of oxygen and argon from its mixture with nitrogen.
7. The adsorbent is useful for the chromatographic separation of oxygen nitrogen and argon.

We claim:

1. A process for preparing a molecular sieve adsorbent for selective adsorption of oxygen from air, the process consisting essentially of:
   (i) exchanging zeolite X with water-soluble salt of a rare earth metal selected from the group consisting of cerium, europium, gadolinium and any mixture thereof;
   (ii) filtering the mixture, washing the powder or pellet with heated distilled water until it is free from anions to obtain an exchanged zeolite;
   (iii) drying the exchanged zeolite;
   (iv) and activating the exchanged zeolite at the temperature range of 350 to 450° C. for a period in the range of 3-6 hours followed by cooling under inert or vacuum,
   wherein Na cations of zeolite are exchanged with salts of the rare earth metals selected from chloride, nitrate and acetate,
   wherein the cation exchange is carried out at a temperature in the range of 30° C. to 90° C. for a period in the range of 4 to 8 hours, and
   wherein the adsorbent has adsorbence up to 850 mm Hg.

2. A process as claimed in claim 1 wherein the zeolite X is used in powder form has 100% crystallinity or pellet form.

3. A process as claimed in claim 1 wherein the cation exchange is carried out at a cation concentration in the range of 0.01 to 0.1 M solution.

4. A process as claimed in claim 1 wherein the exchanged zeolite is dried in a temperature range of 20° C. to 80° C. in air or under vacuum.

5. A process for preparing a molecular sieve adsorbent for selective adsorption of oxygen from air, the process consisting essentially of:
   (i) exchanging zeolite X with water-soluble salt of a rare earth metal selected from the group consisting of cerium, europium, gadolinium and any mixture thereof;
   (ii) filtering the mixture, washing the powder or pellet with heated distilled water until it is free from anions to obtain an exchanged zeolite;
   (iii) drying the exchanged zeolite;
   (iv) and activating the exchanged zeolite at the temperature range of 350 to 450° C. for a period in the range of 3-6 hours followed by cooling under inert or vacuum, wherein Na cations of zeolite are exchanged with salts of the rare earth metals selected from chloride, nitrate and acetate, and wherein the cation exchange is carried out at a temperature in the range of 30° C. to 90° C. for a period in the range of 4 to 8 hours.

6. A process as claimed in claim 5 wherein the zeolite X is used in powder form has 100% crystallinity or pellet form.

7. A process as claimed in claim 5 wherein the cation exchange is carried out at a cation concentration in the range of 0.01 to 0.1 M solution.

8. A process as claimed in claim 5 wherein the exchanged zeolite is dried in a temperature range of 20° C. to 80° C. in air or under vacuum.

* * * * *